(12) United States Patent
Chen et al.

(10) Patent No.: US 9,740,321 B2
(45) Date of Patent: Aug. 22, 2017

(54) METHOD FOR OPERATING APPLICATION PROGRAM AND MOBILE ELECTRONIC DEVICE USING THE SAME

(71) Applicant: HTC Corporation, Taoyuan (TW)

(72) Inventors: Yu-Chuan Chen, Taoyuan (TW); Hung-I Weng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 335 days.

(21) Appl. No.: 14/695,017

(22) Filed: Apr. 23, 2015

(65) Prior Publication Data

US 2015/0227250 A1   Aug. 13, 2015

Related U.S. Application Data

(63) Continuation of application No. 13/612,782, filed on Sep. 12, 2012, now Pat. No. 9,041,653, which is a continuation-in-part of application No. 12/270,865, filed on Nov. 14, 2008, now Pat. No. 8,564,545.

(30) Foreign Application Priority Data

Jul. 18, 2008   (TW) ................................ 97127446 A

(51) Int. Cl.
  *G06F 3/041*   (2006.01)
  *G06F 3/0488*   (2013.01)

(52) U.S. Cl.
  CPC .......... *G06F 3/0412* (2013.01); *G06F 3/0416* (2013.01); *G06F 3/0488* (2013.01); *G06F 3/04886* (2013.01); *G06F 2203/04104* (2013.01)

(58) Field of Classification Search
  CPC .. G06F 3/0412; G06F 3/0488; G06F 3/04886; G06F 3/0416; G06F 2203/04104
  See application file for complete search history.

(56) References Cited

U.S. PATENT DOCUMENTS

| | | | |
|---|---|---|---|
| 2006/0140480 A1* | 6/2006 | Seto | G06K 9/222 382/187 |
| 2007/0030256 A1* | 2/2007 | Akaike | G06F 3/04886 345/173 |
| 2007/0152977 A1* | 7/2007 | Ng | G06F 3/03547 345/173 |
| 2007/0229477 A1* | 10/2007 | Ludwig | G10H 1/00 345/173 |
| 2007/0236475 A1* | 10/2007 | Wherry | G06F 3/0485 345/173 |
| 2007/0247442 A1* | 10/2007 | Andre | G06F 3/041 345/173 |

(Continued)

*Primary Examiner* — Andrew Sasinowski
(74) *Attorney, Agent, or Firm* — Jianq Chyun IP Office

(57) ABSTRACT

A method of controlling an electronic device, an electronic device using the same, and a computer program product are provided. The method includes detecting a plurality of touch areas on a touch screen so that a plurality of touch points contained within each of the touch areas are obtained, respectively determining a typical coordinate value corresponding to each of the touch areas according to a coordinate value of each of the touch points within the touch areas, selecting one or more active objects displayed on the touch screen according to the typical coordinate value corresponding to each of the touch areas, and triggering an action associated with the one or more active objects.

30 Claims, 16 Drawing Sheets

(56) References Cited

U.S. PATENT DOCUMENTS

2007/0257891 A1* 11/2007 Esenther ................. G06F 3/044
                                                                        345/173
2008/0165133 A1*  7/2008 Blumenberg ......... G06F 3/0482
                                                                        345/173

* cited by examiner

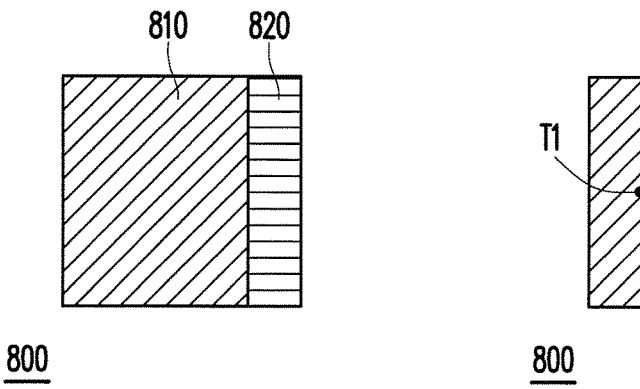
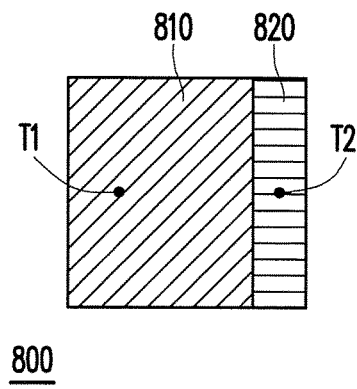
FIG. 8A                FIG. 8B
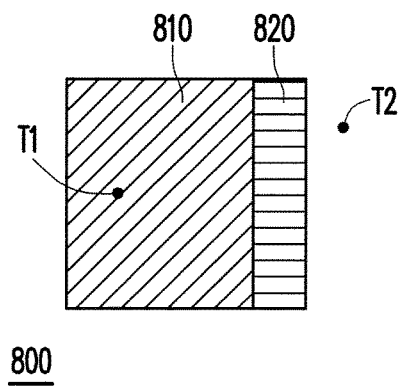
FIG. 8C
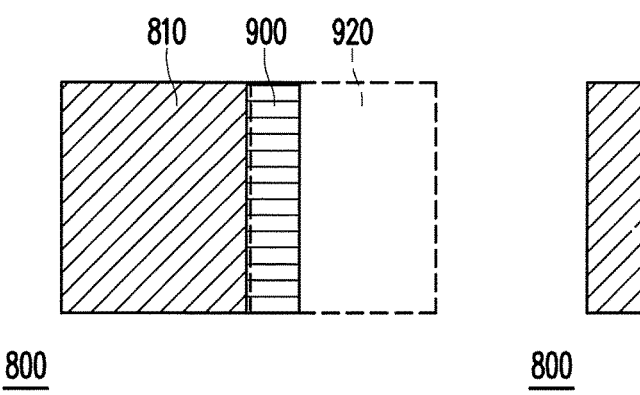
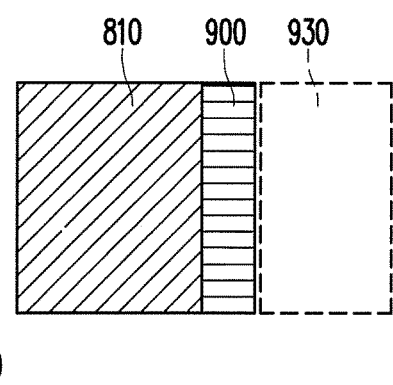
FIG. 9A                FIG. 9B

METHOD FOR OPERATING APPLICATION PROGRAM AND MOBILE ELECTRONIC DEVICE USING THE SAME

CROSS-REFERENCE TO RELATED APPLICATION

This application is a continuation application of and claims the priority benefit of U.S. application Ser. No. 13/612,782, filed on Sep. 12, 2012, now allowed. The prior U.S. application Ser. No. 13/612,782 is a continuation-in-part application of and claims the priority benefit of U.S. application Ser. No. 12/270,865, filed on Nov. 14, 2008, now as U.S. Pat. No. 8,564,545, issued on Oct. 22, 2013 which claims the priority benefit of Taiwan application serial no. 97127446, filed on Jul. 18, 2008. The entirety of each of the above-mentioned patent applications is hereby incorporated by reference herein and made a part of this specification.

BACKGROUND OF THE INVENTION

1. Field of the Invention

The present invention relates to a method for operating an application program and a mobile electronic device using the same.

2. Description of Related Art

With development of the touch technique, a touch screen can not only be used as an input interface while displaying images, but also has advantages of low cost and durability, etc., so that it becomes popular in the market. Accordingly, to lighten the consumer electronic products, a plurality of manufacturers utilizes the touch screen to substitute a conventional screen for saving a hardware keyboard space, so as to slim the product or provide a larger display area for disposing a large-sized touch screen. For a user, a larger screen can provide a perfect visual enjoyment, and can facilitate operations thereof. Moreover, slimness of the product can also facilitate the user.

When the touch screen is used as an input interface, a mechanism for judging and responding actions of the user has to be developed. Wherein, a software input panel (SIP) is a technique of inputting characters via the touch screen. When the user operates the conventional hardware keyboard, the consumer electronic product can judge a pressed key according to a signal generated when the key is pressed. However, when the consumer electronic product using the SIP as the input interface is utilized, an extra method for judging which key on the SIP is selected by the user has to be designed. Generally, when the user touches the SIP via a finger, a SIP application program is applied to compare finger-covered areas of the keys, so as to select a key with the most area thereof being covered by the finger as a key desired to be selected by the user. However, based on such a key-selecting mechanism, the selected key is usually not a key desired to be pressed by the user during operating the touch screen according to utilization experiences and investigation results.

Accordingly, considering a product utilization efficiency, it is a main object for the electronic product manufacturers to design an algorithm to quickly and accurately judge the actions of the user, so as to reduce error responses and effectively complete characters input via the touch screen.

SUMMARY OF THE INVENTION

The present invention is directed to a method for operating an application program and a mobile electronic device using the same.

The present invention is directed to a method of controlling an electronic device having a touch screen. The method includes detecting a plurality of touch areas on the touch screen so that a plurality of touch points contained within each of the touch areas are obtained, respectively determining a typical coordinate value corresponding to each of the touch areas according to a coordinate value of each of the touch points within the touch areas, selecting one or more active objects displayed on the touch screen according to the typical coordinate value corresponding to each of the touch areas, and triggering an action associated with the one or more active objects.

The present invention provides an electronic device having a touch screen, memory, one or more processors and/or one or more instructions. In which, the one or more instructions are stored in the memory and configured to be executed by the one or more processors to detect a plurality of touch areas on the touch screen so that a plurality of touch points contained within each of the touch areas are obtained, to respectively determine a typical coordinate value corresponding to each of the touch areas according to a coordinate value of each of the touch points within the touch areas, to select one or more active objects displayed on the touch screen according to the typical coordinate value corresponding to each of the touch areas, and to trigger an action associated with the one or more active objects.

The present invention provides a computer program product for use in conjunction with an electronic device comprising a touch screen, the computer program product comprising a computer readable storage medium and an executable computer program mechanism embedded therein, the executable computer program mechanism comprising instructions for detecting a plurality of touch areas on the touch screen so that a plurality of touch points contained within each of the touch areas are obtained, respectively determining a typical coordinate value corresponding to each of the touch areas according to a coordinate value of each of the touch points within the touch areas, selecting one or more active objects displayed on the touch screen according to the typical coordinate value corresponding to each of the touch areas, and triggering an action associated with the one or more active objects.

In the present invention, when the user touches the touch screen, all touch points contained within each of the detected touch areas are obtained to determine a typical coordinate value corresponding to each of the touch areas to represent an action of the user, so as to select one or more objects displayed on the touch screen and perform the related action. By such means, the intention of the user using the electronic device can be determined more precisely.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 8A to 8C are schematic diagrams illustrating an object having two object regions according to an embodiment of the present invention.

FIGS. 9A to 9D are schematic diagrams illustrating an object having two object regions according to another embodiment of the present invention.

DESCRIPTION OF EMBODIMENTS

Figure 1:
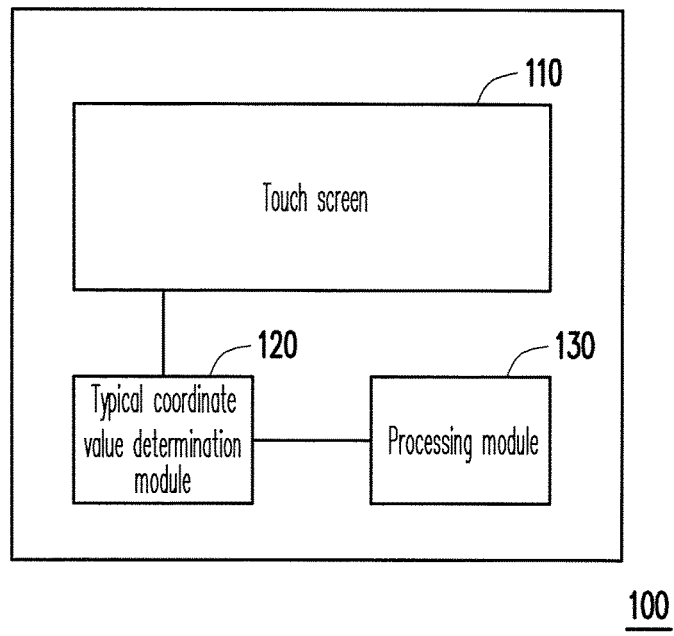
FIG. 1 is a block diagram illustrating an electronic device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram illustrating an electronic device according to an embodiment of the present invention. Referring to FIG. 1, the electronic device 100 includes a touch screen 110, a typical coordinate value determination module 120 and a processing module 130. For example, the electronic device 100 may be a mobile phone, a personal digital assistant (PDA) mobile phone, a smartphone, a touch phone, a mobile computer, a laptop, a tablet personal computer (PC), a digital camera, a handheld gamer, a multimedia player, or an e-book, etc., which is not limited by the present invention.

The touch screen 110 is for example a resistive touch screen, which can be used as a display interface of the electronic device 100, and can further detect each of touch areas formed when an input tool (such as a finger or a stylus) touches the touch screen 110, and obtain all of touch points contained within each of the touch area.

The typical coordinate value determination module 120 is coupled to the touch screen 110 for determining a typical coordinate value according to a coordinate value of each of the touch points after the touch screen 110 obtains all of the touch points. Wherein, the typical coordinate value determination module 120 is for example a controller, or a chip independently disposed in the electronic device 100. It should be noted that regardless of whether the touch screen 110 detects one or more touch areas, the typical coordinate value determination module 120 can only determine a unique typical coordinate value.

The processing module 130 is coupled to the typical coordinate value determination module 120, and controls an application program installed within the electronic device 100 to execute a corresponding function according to the typical coordinate value after the typical coordinate value determination module 120 determines the typical coordinate value.

Figure 2:
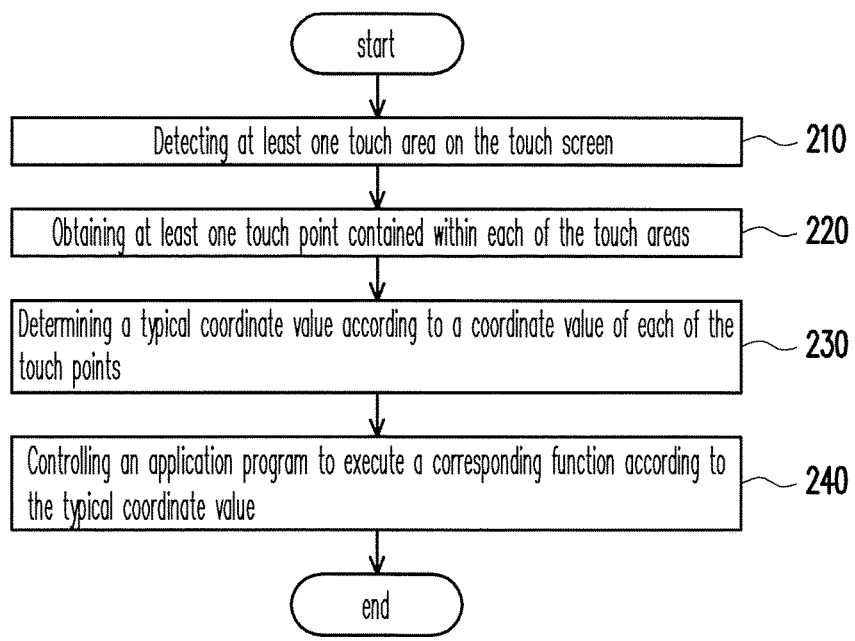
FIG. 2 is a flowchart illustrating a method for controlling an application program according to an embodiment of the present invention.

In the following embodiment, the electronic device 100 is taken as an example to describe steps for controlling the application program via the touch screen 110 in detail. FIG. 2 is a flowchart illustrating a method for controlling an application program according to an embodiment of the present invention. Referring to FIG. 1 and FIG. 2, when the user operates the electronic device 100, the touch screen 100 is touched by the input tool such as the finger or the stylus. Since the input tool has its own width, in step 210, after the input tool touches the touch screen 110, the touch areas generated there between are detected. Wherein, the touch screen 110 can simultaneously detect one or more touch areas. Next, in step 220, the touch screen 110 obtains all of the touch points contained within each of the touch areas.

Next, in step 230, the typical coordinate value determination module 120 determines a typical coordinate value according to a coordinate value of each of the touch points. In an embodiment, the coordinate value of each of the touch points includes two subcomponents of an x-axis coordinate value and a y-axis coordinate value. In the following content, how the typical coordinate value determination module 120 calculates the typical coordinate value according to the coordinate value of each of the touch points is described in detail. After the touch screen 110 obtains all of the touch points of each of the touch areas, the typical coordinate value determination module 120 obtains the x-axis coordinate value of each of the touch points, and calculates an average value of the x-axis coordinate values (referred to as x-axis coordinate average value hereinafter). Similarly, the typical coordinate value determination module 120 also obtains the y-axis coordinate value of each of the touch points, and calculates an average value thereof to obtain a y-axis coordinate average value. After the calculation, the typical coordinate value determination module 120 takes the x-axis coordinate average value and the y-axis coordinate value as the typical coordinate value representing all of the touch points.

In another embodiment, the typical coordinate value determination module 120 first defines weight values for each of the x-axis coordinate values and each of the y-axis coordinate values. Wherein, the method for defining the weight values includes obtaining a pressure value (the pressure value relates to a pressing force exerted to the touch screen 110 by the user) of each of the touch points, and defining the weight values of the x-axis coordinate value and the y-axis coordinate value of each of the touch points according to the corresponding pressure value. For example, the greater the pressure value is, the higher the weight value is. Moreover, the typical coordinate value determination module 120 can also define the weight value according to former utilization experiences of the user. For example, the weight values of the x-axis coordinate values and the y-axis coordinate values that cover the key display areas in the SIP can be defined with higher weight values than those cover no key display areas.

Next, the typical coordinate value determination module 120 calculates an x-axis coordinate weighted average value (for example, respectively calculates a multiplication of each of the x-axis coordinates values and the corresponding weight value, and then calculates an average of the multiplications) according to the x-axis coordinate values and the corresponding weight values, and calculates an y-axis coordinate weighted average value (for example, respectively calculates a multiplication of each of the y-axis coordinates values and the corresponding weight value, and then calculates an average of the multiplications) according to the y-axis coordinate values and the corresponding weight values. Finally, the x-axis coordinate weighted average value and the y-axis coordinate weighted average value are taken as the typical coordinate value for all of the touch points.

According to the above description, the typical coordinate value calculated by the typical coordinate value determination module 120 is a unique and absolute coordinate value. However, it should be noted that the method for calculating the x-axis coordinate average value and the y-axis coordinate average value includes calculating the average value according to a number of the touch points, or calculating a weighted average value according to an experience value, which is not limited by the present invention.

Finally, in step 240, the processing module 130 controls the application program within the electronic device 100 to execute a corresponding function according to the typical coordinate value, so as to complete controlling of the application program via the touch screen 110. It should be noted that the processing module 130 can control any application program that is executed in the electronic device 100 to execute a function according to the typical coordinate value, wherein a type of the application program is not limited by the present invention.

In the aforementioned embodiment, the touch points detected by the touch screen 110 correspond to an operation action of the user, and the typical coordinate value calculated by the typical coordinate value determination module 120 is used for representing the touch points. Therefore, the operation performed to the touch screen 110 by the user can be represented by the typical coordinate value. Accordingly, after the processing module 130 transmits the typical coordinate value to the application program, the function executed by the application program according to the typical coordinate value can represent the operation action of the user.

It should be noted that in another embodiment, the electronic device 100 only includes a touch screen 110 and a processing module 130 coupled to each other. Wherein, the processing module 130 can not only execute the function disclosed as that in the aforementioned embodiment, but can also executes various operations executed by the typical coordinate value determination module 120 in the aforementioned embodiment. Therefore, in the present embodiment, only the processing module 130 is required to determine the typical coordinate value representing all of the touch points, and an extra controller or chip used for implementing functions of the typical coordinate value determination module 120 is not required.

Types of the application program executed in the electronic device 100 are diversified. In the following content, a SIP application program is taken as an example for describing detailed steps of executing the function of the application program according to the typical coordinate value under control of the processing module 130. Wherein, the SIP application program is used for displaying a SIP including a plurality of keys on the touch screen 110.

After the processing module 130 receives the typical coordinate value transmitted by the typical coordinate value determination module 120, the processing module 130 transmits the typical coordinate value to the SIP application program. The SIP application program determines a selected key from all of the keys of the SIP according to the received typical coordinate value.

Figure 3:
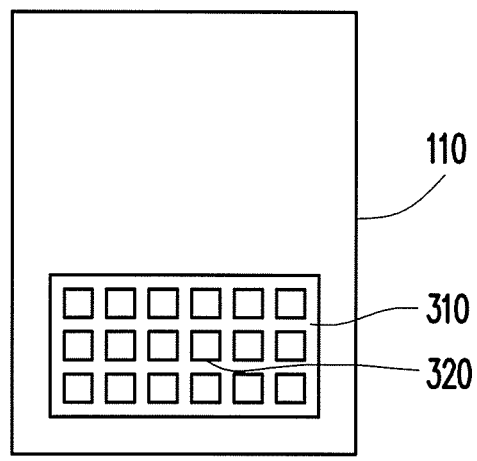
FIG. 3 is a schematic diagram illustrating a touch screen according to an embodiment of the present invention.

FIG. 3 is a schematic diagram illustrating a touch screen according to an embodiment of the present invention. Referring to FIG. 1 and FIG. 3, the SIP application program illustrates a SIP (for example, the SIP 310 of FIG. 3) including a plurality of keys on the touch screen 110 according to a size of the touch screen 110 and a predetermined keyboard display area, and illustrates the plurality of keys according to the type of the SIP 310 and a key size predetermined value. Accordingly, after the SIP application program receives the typical coordinate value, a key display area of each of the keys on the touch screen 110 is first calculated according to the keyboard display area and the key size predetermined value of each of the keys. Then, a key display area containing the typical coordinate value is found from the key display areas, and the key corresponding to such key display area is taken as the selected key. For simplicity's sake, assuming the key display area corresponding to a key 320 contains the typical coordinate value transmitted from the processing module 130, so that the key 320 is regarded as the selected key by the SIP application program.

Figure 4A:
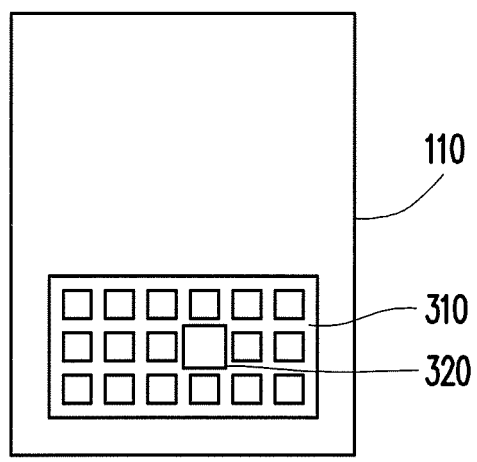
FIGS. 4A and 4B are schematic diagrams illustrating a touch screen according to another embodiment of the present invention.

In an embodiment, after the SIP application program determines the selected key (for example, the key 320), the selected key is enlarged and displayed on the touch screen 110. For example, the SIP application program proportionally enlarges the selected key, and a result thereof is shown as the key 320 of FIG. 4A.

Figure 4B:
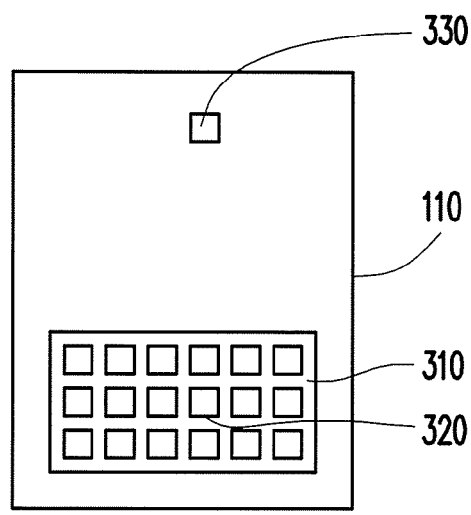

In another embodiment, as shown in FIG. 4B, after the selected key (i.e., the key 320) is determined, the SIP application program displays an image 330 at another region (for example, a top region) of the touch screen 110. Wherein, the image 330 has a same appearance with that of the selected key 320.

In still another embodiment, the image displayed by the SIP application program includes an input prompt information. Wherein, the input prompt information for example alternately displays the characters corresponding to the selected keys, and the character corresponding to the selected key relates to a present input mode of the electronic device 100. The user can know the character to be input when the selected key is released via the input prompt information of the image.

As described above, the SIP application program judges the key selected by the user according to the typical coordinate value, and via various visual feedback effects (for example, enlarging and displaying the selected key, or displaying the image at the other region), the user can easily judge whether the input tool presses a correct position. On the other hand, the visual feedback allows the user to preview a character to be input, so that decreasing of utilization efficiency of the electronic device 100 due to operation errors thereof can be avoided.

Figure 5:
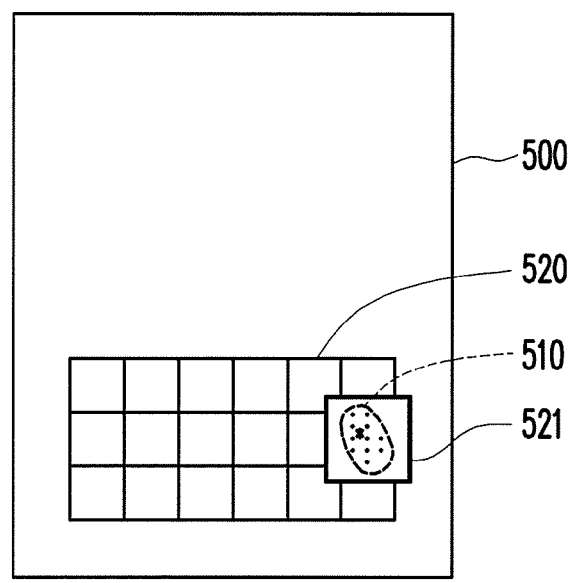
FIG. 5 is a schematic diagram illustrating a pressed touch screen according to an embodiment of the present invention.

According to the user's experiences and investigation results, the unique typical coordinate value obtained by calculating the coordinate values of the touch points is generally the position desired to be pressed by the user when operating the touch screen. Therefore, as shown in FIG. 5, when a touch screen 500 displays a SIP 520, assuming a touch area 510 generated when the user touches the touch screen 500 contains 11 touch points (represented by symbols "•" in FIG. 5), and the typical coordinate value (a position thereof is represented by a symbol "*") obtained according to the coordinate values of the touch points corresponds to the key desired to be pressed by the user (i.e., a key area 521 containing the typical coordinate value). In the present embodiment, the key 521 for example presents a visual feedback effect of being enlarged and displayed at an original position, so as to help the user confirming whether the pressed key is the key desired to be selected. In another embodiment, an image having an appearance similar to that of the key 521 is displayed at the other region (for example, a top region) of the touch screen 500, so that the user can easily confirm whether the correct key is pressed.

The aforementioned embodiment can be applied to any electronic device operated via the touch screen. A touch technique supported by the resistive touch screen is mostly a single-point touch technique, the present invention is suitable for, but not limited to, the electronic device equipped with the resistive touch screen. According to the characteristic of the resistive touch screen, the operation actions of the user can be simply, quickly and accurately reflected according to the present invention, so that an optimal operation effect can be provided.

Figure 6:
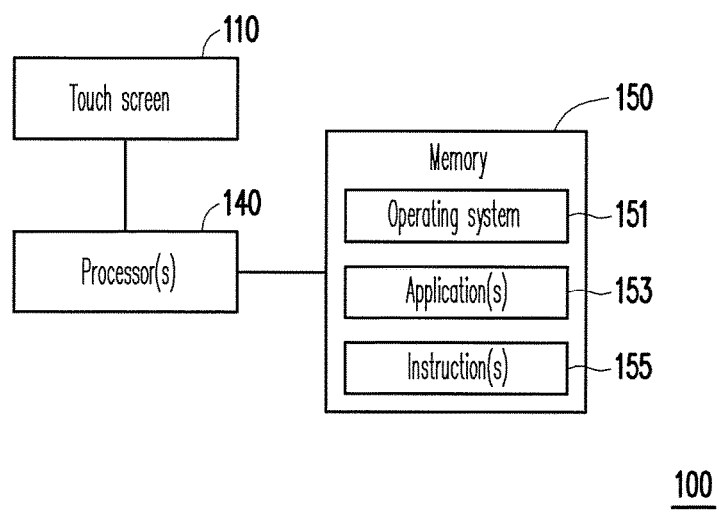
FIG. 6 is a block diagram illustrating an electronic device according to another embodiment of the present invention.

FIG. 6 is a block diagram illustrating an electronic device according to another embodiment of the present invention. Referring to FIG. 1B, the electronic device 100 includes a touch screen 110, a memory 150, and one or more processors 140.

The memory 150 may be an internal storage unit such as a random access memory or a non-volatile memory (e.g., a flash memory, or a magnetic disk storage device). The memory 150 may also be an external storage unit such as Secure Digital (SD) card, a SIM card, or other storage media which can be externally connected to the electronic device 100. The memory 150 may further be a networked online storage that can be accessed through a communication network by a network component (not shown) of the electronic device 100.

In the present embodiment, at least an operating system 151, one or more applications 153, and/or one or more instructions 155 are stored in the memory 150.

The operating system 151 includes various software components and/or drivers and is used for managing a general operation of the electronic device 100. For example, the operating system 151 provides a user interface for users to interact with the electronic device 100, manages applications 153 that are running on the electronic device 100, and manages files stored in the electronic device 100.

The one or more applications 153 include, but not limited to, a phone application, an email application, a message application, a contact application, a social network application, or a calendar application. The applications 153 may be native applications pre-installed on the electronic device 100, or may be downloaded from third-party sites or online stores.

The one or more instructions are executed by the one or more processors 150. To be specific, the one or more processors 150 perform a method of controlling the electronic device 100 of the present embodiment according to the instructions. The controlling method of the present embodiment is described later with reference of figures.

The one or more processors 150 configured to run the operating system, applications and/or instructions stored in the memory 150, perform different functions for the electronic device 100 and process data after the electronic device 100 is powered on.

Figure 7:
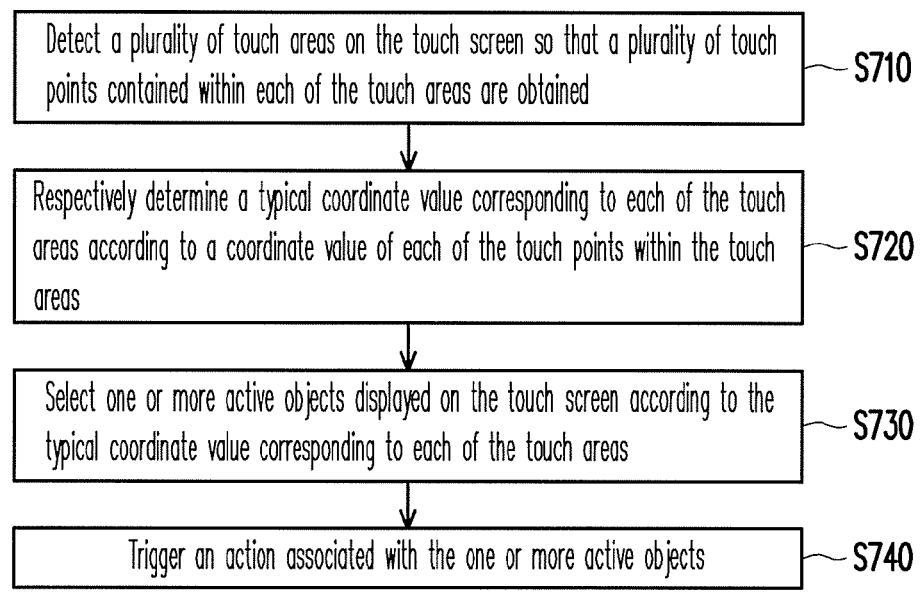
FIG. 7 is a flowchart illustrating a method of controlling an electronic device according to an embodiment of the present invention.

Below, the operation of the electronic device 100 will be described in detail with reference to another embodiment of the invention. FIG. 7 is a flow chart of a method of controlling an electronic device according to the embodiment of the present invention. Please refer to FIG. 6 and FIG. 7.

In step S710, a plurality of touch areas on the touch screen 110 are detected in the same time interval, and then a plurality of touch points contained within each of the touch areas are obtained. For example, when the time interval is very short, it means that the touch areas are detected almost at the same time. On the other hand, when the time interval is relatively long (e.g., for several seconds), the touch areas may be detected successively. The touch areas are, for example, corresponding to multiple taps on the touch screen 110. In one embodiment, the touch areas may correspond to two or more concurrent contact with the touch screen 110. For instance, while the user touches the touch screen 110 with two or more fingers (or other input tools) at the same time or substantially at the same time, two or more touch areas are detected concurrently. Furthermore, in another embodiment, if one input tool touches the touch screen 110 and holds at the first moment, and another input tool touches the touch screen 110 at the second moment, both touch areas are detected as long as those two moments are in the same time interval. While a user taps the touch screen 110 with his/her finger (or other input tool) twice or more, two or more touch areas corresponding to each tap are detected.

Next, in step S720, a typical coordinate value corresponding to each of the touch areas is respectively determined according to a coordinate value of each of the touch points within the touch areas. In the following embodiments, the coordinate value includes two subcomponents of an x-axis coordinate value and a y-axis coordinate value. The manner of determining the typical coordinate value of each touch area is similar to step 220 in FIG. 2. For example, the typical coordinate value of a touch area may be an average of the coordinate value of each of the touch points contained therein. Alternatively, the typical coordinate value of a touch area may be a weight average of the coordinate value of each of the associated touch points, which is weighted according to the pressure and/or the position of the touch points. For example, a weight value of each of the touch points is determined according to a comparison between the location of the touch point and one or more specific object display areas on the touch screens 110. Each of the specific object display areas is an area on the touch screen 100 for displaying a specific object, wherein the specific object may be a key on the software input panel, an application icon, a widget, a software button, an input field, or any element which can interact with the user. Among all of the touch points within the same touch area, the weight value of any of the touch points that is within any specific object display area is determined to be higher than the weight value of those touch points that are not within any specific object display areas. A weighted average of the coordinate value of each of the associated touch points is calculated by adding together results of multiplying the coordinate value of each touch point by the corresponding weight value. The other examples of how to determine the typical coordinate value will be described later with reference of figures.

In step S730, one or more active objects displayed on the touch screen 110 are selected according to the typical coordinate value corresponding to each of the touch areas.

In one embodiment, an average, a weighted average, or any kind of statistical pointer of all of the typical coordinate values is obtained for the selection of the one or more active objects.

When the weighted average of all of the typical coordinate values is regarded as the statistical pointer for selecting the one or more active objects, a weight value of each typical coordinate value is determined according to a pressure of the associated touch points and/or a location of the typical coordinate value. In another embodiment, the weight value of each typical coordinate value is predetermined. Then the weighted average is calculated by adding together results of multiplying the typical coordinate value corresponding to each of the touch areas by the corresponding weight value. For example, it is assumed that an object divided into a plurality of object regions is displayed on the touch screen 110. While each typical coordinate value is respectively located in one of the object regions of the object displayed on the touch screen 110, the weight value of each of the typical coordinate value is determined according to a size of the located object region.

As shown in FIG. 8A, there is, for example but not limited to, only one object 800 displayed on the touch screen 110, wherein the object 800 is divided into two object regions (i.e., the region represented by oblique lines and the region represented by horizontal lines), the object regions are corresponding to related but different functions, and each of the object regions is corresponding to one interaction area, such as the interaction areas 810 and 820. In this embodiment, a size of each of the interaction areas 810 and 820 is identical to the corresponding object region. Different function will be performed while the user taps on different one of the interaction areas 810 and 820.

It is assumed that there are two typical coordinate values determined in accordance with two touch areas, wherein the two touch areas is, for example, detected in response to a double-tap gesture preformed by the user. However, in another embodiment, the two touch areas may be detected in response to two concurrent contacts with the touch screen 110. As shown in FIG. 8B, one typical coordinate value represented by point T1 is located in the object region represented by oblique lines while another typical coordinate value represented by point T2 is located in the object region represented by horizontal lines. In this embodiment, the weight value of the typical coordinate value represented by point T2 is higher than the weight value of the typical coordinate value represented by point T1 since the size of the object region represented by horizontal lines is relatively smaller than that of the object region represented by oblique lines. For example, the weight value of the typical coordinate value located in the larger object region is determined to be zero. Alternatively, the weight value of the typical coordinate value located in the larger object region is very small in proportional to the area. The weight value can be predetermined. Accordingly, the weighted average of the typical coordinate values represented by points T1 and T2 is equal to the typical coordinate values represented by point T2.

In another embodiment, the weight value of any typical coordinate value located in an object region of an object is higher than the weight value of those typical coordinate values not located in any object region of any object. As shown in FIG. 8C, the typical coordinate value represented by point T1 is located in the object region represented by oblique lines while the typical coordinate value represented by point T2 is located outside of the two object regions of the object 800 displayed alone on the touch screen 110, therefore the weight value of the typical coordinate value represented by point T1 is higher than that of the typical coordinate value represented by point T2. In this embodiment, it is assumed that the weight value of the typical coordinate value not located in any object region is determined to be zero or a predefined value which is very small. Accordingly, the weighted average of the typical coordinate values represented by points T1 and T2 is equal to the typical coordinate values represented by point T1.

In another example, a size of each interaction area may be equal to or larger than the corresponding object region. As shown in FIG. 9A, two object regions of the object 800 are respectively corresponding to the interaction areas 810 and 920. In which, the size of the interaction area 810 is equal to the corresponding object region (i.e., the region represented by oblique lines). The interaction area 920 overlaps the corresponding object region 900 (i.e., the region represented by horizontal lines), and the size of the interaction area 920 is larger than the corresponding object region 900. However, as shown in FIG. 9B, the interaction area 920 may have an extended area from the object region 900. That is, the interaction area 920 dose not overlap the corresponding object region 900.

Figure 9C:
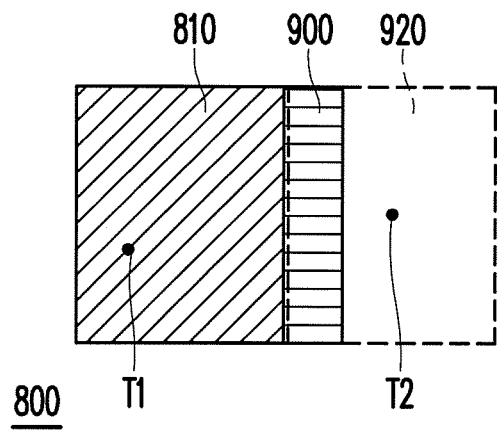
Figure 9D:
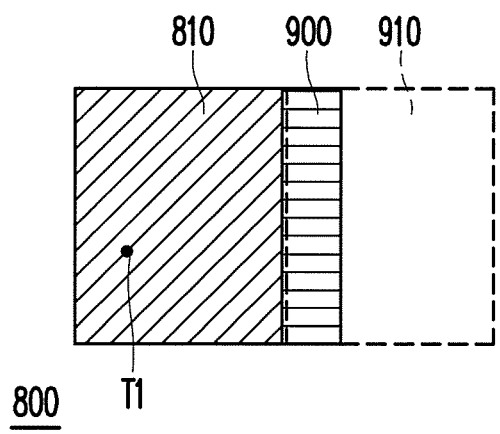

In this embodiment, the weight value of any typical coordinate value within the object region 900 represented by horizontal lines is higher than the weight value of the typical coordinate value within the object region represented by oblique lines since the size of object region 900 represented by horizontal lines is smaller than that of the object region represented by oblique lines. Moreover, the weight value of any typical coordinate value within the interaction area 920 is identical with the weight value of the typical coordinate value within the object region 900 represented by horizontal lines. Accordingly, as shown in FIG. 9C, the weight average of the typical coordinate values represented by the points T1 and T2 is more close to the typical coordinate value represented by the point T2 since the weight value of the typical coordinate value represented by the point T2 (outside the object region represented by horizontal lines but inside the interaction area 920) is higher than the weight value of the typical coordinate value represented by the point T1. However, as shown in FIG. 9D, if there is only one typical coordinate value represented by the point T1 has been determined, even though the weight value thereof is lower than that of the object region 900, the one or more active objects will be selected according to the typical coordinate value represented by the point T1.

It should be noted that the manner of obtaining the statistical pointer of the typical coordinate value corresponding to each of the touch areas is not limited by the foregoing embodiments. After the statistical pointer is obtained, in one embodiment, if the statistical pointer is located in an object display area of an object displayed on the touch screen 110, the object with the object display area that the statistical pointer is located therein is selected as the active object.

Figure 10A:
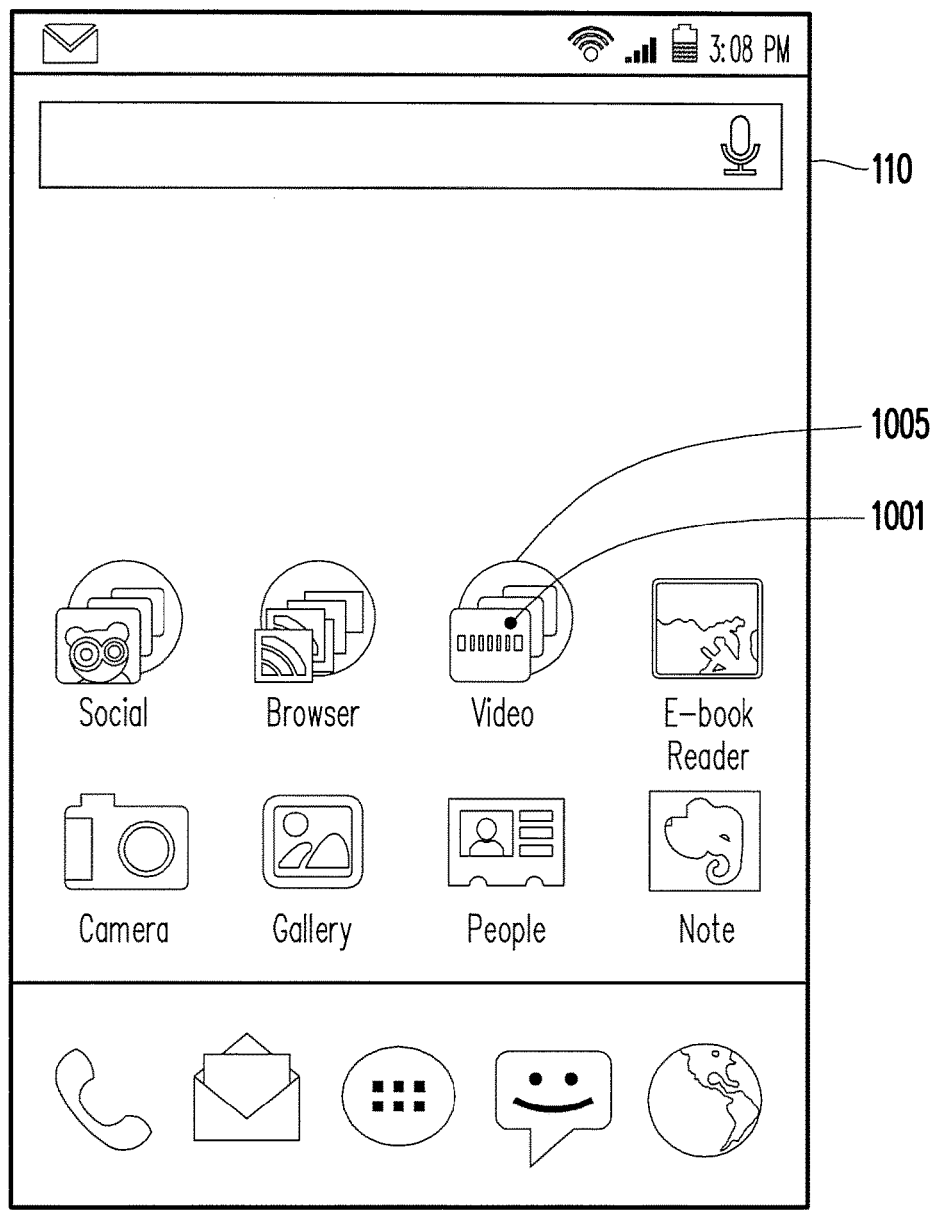
FIGS. 10A to 10B are schematic diagrams illustrating the selection of one or more active objects according to an embodiment of the present invention.

As shown in FIG. 10A, the statistical pointer represented by the point 1001 is located in an object display area of an icon 1005 of the media player application, therefore the icon 1005 of the media player application is selected to be the active object.

Figure 10B:
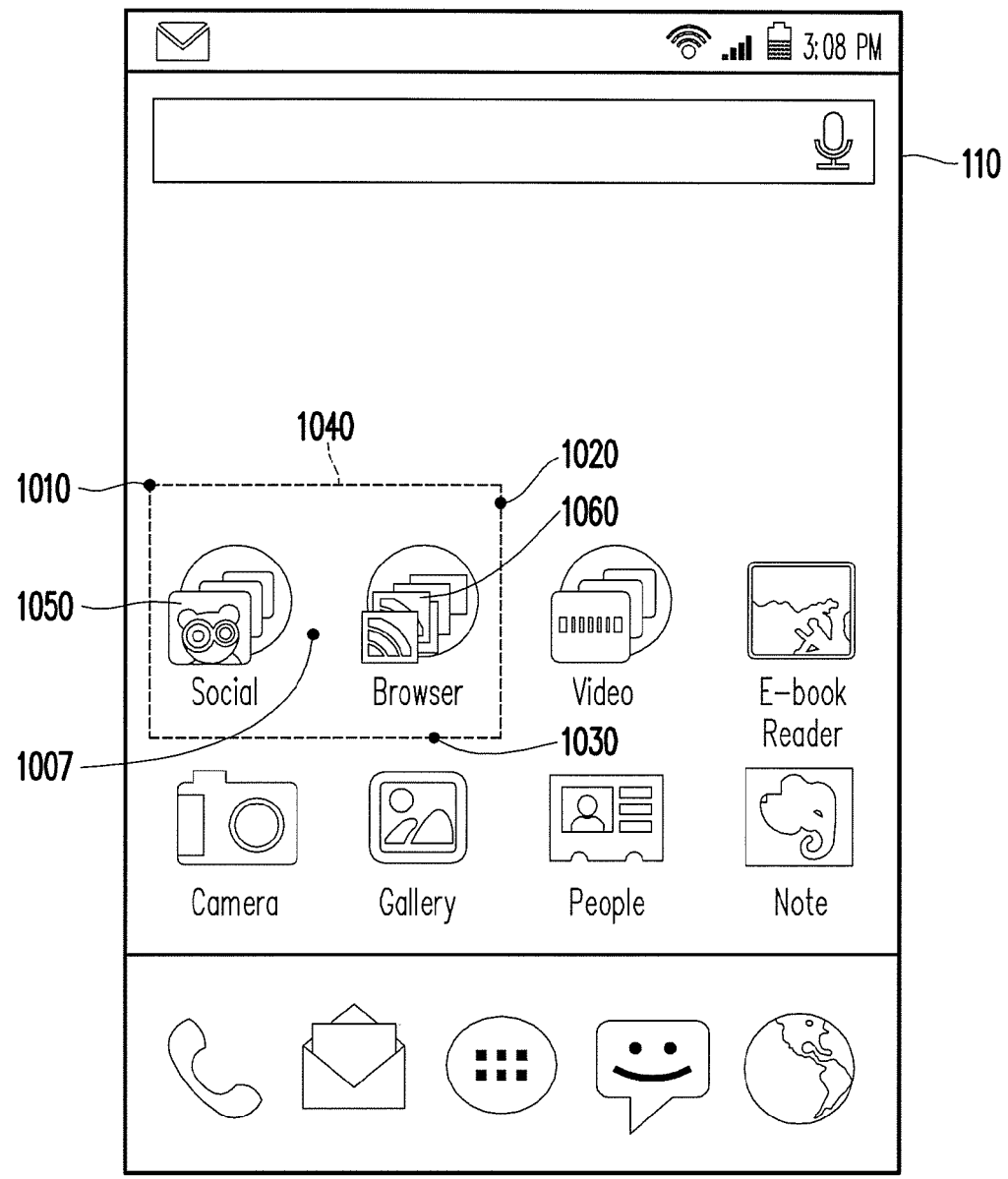

In another embodiment, if the statistical pointer is not located in any of the object display area of each of the one or more objects displayed on the touch screen 110, an object selecting scope on the touch screen 110 is determined according to the typical coordinate value corresponding to each of the touch areas, and one or more objects located in the object selecting scope are selected to be the one or more active objects. As shown in FIG. 10B, the statistical pointer represented by the point 1007 is not located in any of the object display area of each of the objects displayed on the touch screen 110, therefore an object selecting scope 1040 on the touch screen 110 is determined according to the typical coordinate values represented by the points 1010, 1020, and 1030 respectively corresponding to three touch areas. In this embodiment, the object selecting scope 1040 is, for example but not limited to, the largest rectangle that contains the typical coordinate values represented by the points 1010, 1020, and 1030 at any of the four edges, and the icon 1050 of the social network application and the icon 1060 of the network browser application within the object selecting scope 1040 are selected to be the active objects. It should be noted that the shape of the object selecting scope is not limited by the present invention. In another embodiment, if the number of the typical coordinate values is more than two, the object selecting scope may be a polygon with the typical coordinate values as its vertices.

In yet another embodiment, an object selecting scope on the touch screen 110 is determined according to the typical coordinate value corresponding to each of the touch areas for selecting active objects regardless of the position of the statistical pointer. That is, as long as there are multiple touch areas, the object selecting scope is determined for selecting the active objects.

It should be noted that, in the foregoing embodiments, the object selecting scope is rendered dynamically on the touch screen 110 and therefore is visible by users. To be specific, in addition to render in the framebuffer of the touch screen 110, it also shows on the touch screen 110 with regard to the object selecting scope determined.

In order to assist users in identifying the selected one or more active objects, a visual feedback is provided for each of the one or more active objects. The visual feedback may be flashing the one or more active objects, changing size of the one or more active objects, jiggling the one or more active objects, or doing any kind of animation on the one or more active objects.

Figure 11A:
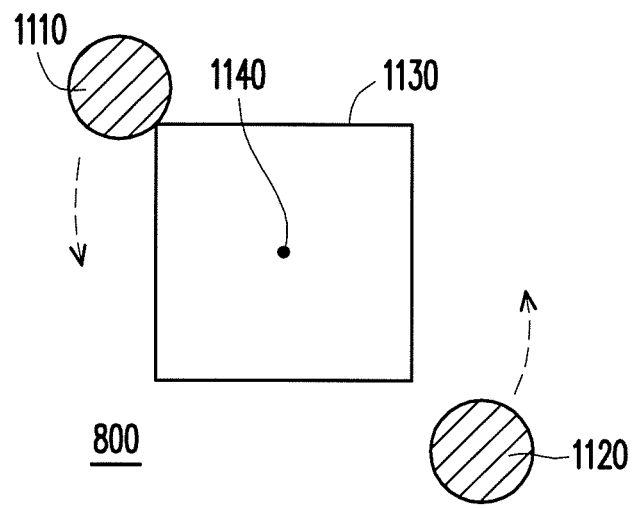
FIGS. 11A to 11B are schematic diagrams illustrating the rotation of an active object according to an embodiment of the present invention.
Figure 11B:
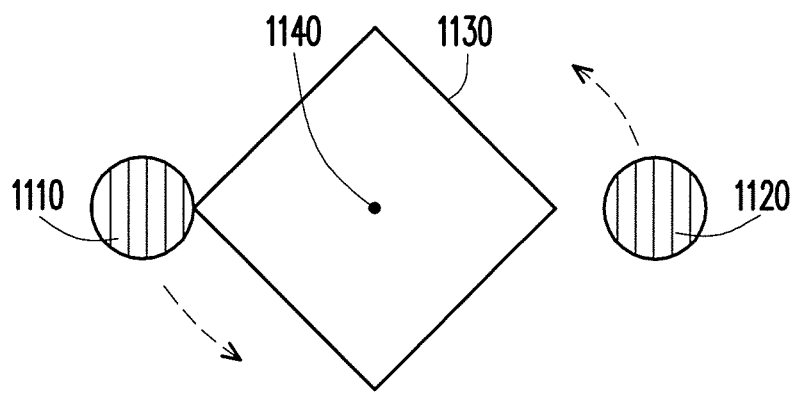

In step S740, an action associated with the one or more active objects is triggered. For example, the action may be launching a corresponding application or executing a corresponding function. Alternatively, the action may be rotating the one or more active objects, moving the one or more active objects, or changing shape of the one or more active objects. To be specific, the action performed on the one or more active objects is in accordance with a movement of the touch areas. For example, as shown in FIGS. 11A and 11B, the active object 1130 containing the statistical pointer represented by the point 1140 is selected according to two touch areas 1110 and 1120 corresponding to two user inputs. While the touch areas 1110 and 1120 rotate counterclockwise in accordance with the user inputs which are not terminated, the active object 1130 is rotated counterclockwise accordingly.

In the following, the manner of determining the typical coordinate value corresponding to each touch area is described in detail. In which, a weighted average of the coordinate value of each of the touch points within the same touch area is regarded as the typical coordinate value of the touch area, and the weight value of any of the touch points that is within any of the specific object display areas on the touch screen 110 is determined to be higher than the weight value of those touch points that are not within the specific object display areas, and each of the specific object display areas is an area for displaying a specific object.

Figure 12:
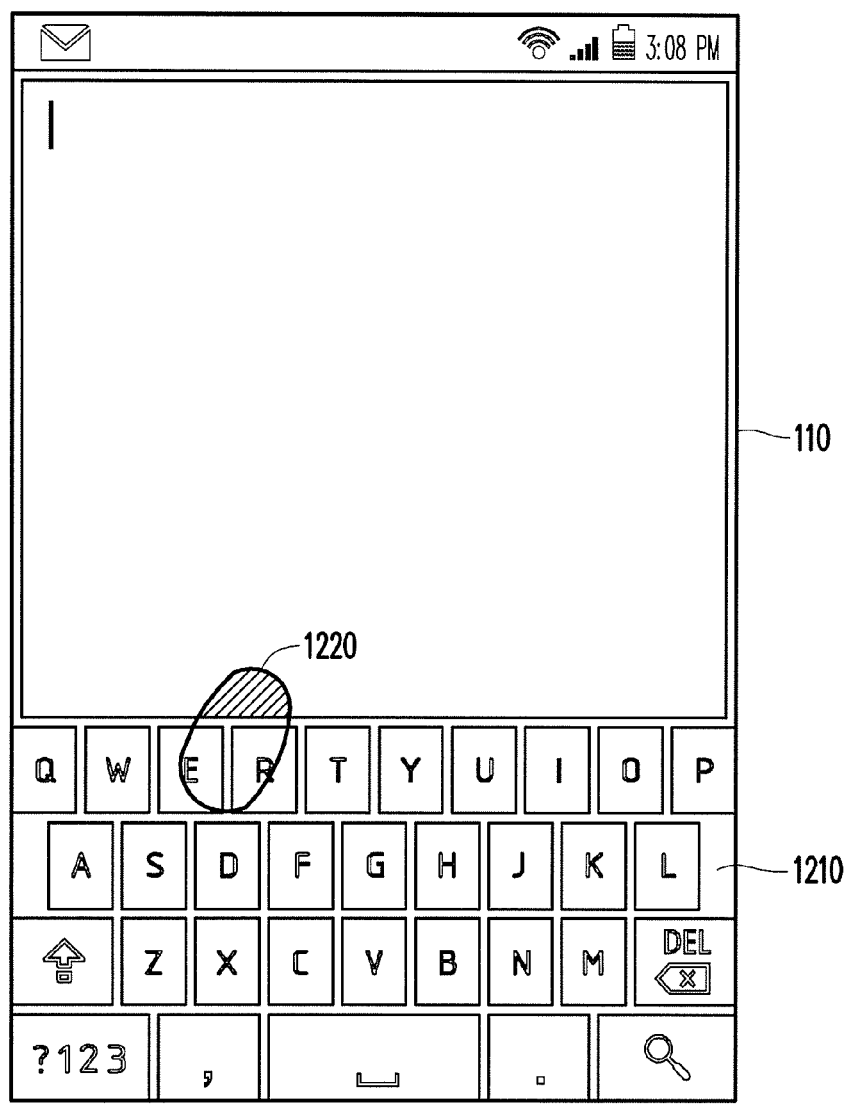
FIGS. 12, 13A, 13B, 15 and 16 are schematic diagrams illustrating a touch screen displaying a software input panel according to embodiments of the present invention.

In one embodiment, the weight value of any of the touch points that is not within any of the specific object display areas is zero. Alternatively, the weight value of any of the touch points that is not within any of the specific object display areas is significant low as predetermined compared to the touch points that is located within any of the specific object display areas. In another embodiment, the weight value of any of the touch points that is not within any of the specific object display areas is significant low compared to the touch points that is located within any of the specific object display areas. In which, the specific objects are, for example but not limited to, keys on a software input panel displayed on the touch screen 110. As shown in FIG. 12, a software input panel 1210 is displayed on the touch screen 110, the weight value of all of the touch points within the upper portion of the touch area 1220 (represented by oblique lines) is, for example, zero, while the weight value of all of the touch points within the lower portion of the touch area 1220 is a positive value. Alternatively, the weight value of all of the touch points within the upper portion of the touch area 1220 is significant low as predetermined compared to the touch points that is located within the lower portion of the touch area 1220. Since the weighted average of the coordinate value of each of the touch points within the touch area 1220 is regarded as the typical coordinate value of the touch area 1220, it is ensured that the typical coordinate value is located in the area for displaying a key on the software input panel 1210, and consequently it is very likely that the statistical pointer associated with the typical coordinate value of the touch area 1220 is within the software input panel. Whereas the display of the software input panel usually means that the user wants to input data, it is reasonable to determine the weight values of the touch points that can be used to ensure the location of the statistical pointer is in the software input panel as far as possible.

Figure 13A:
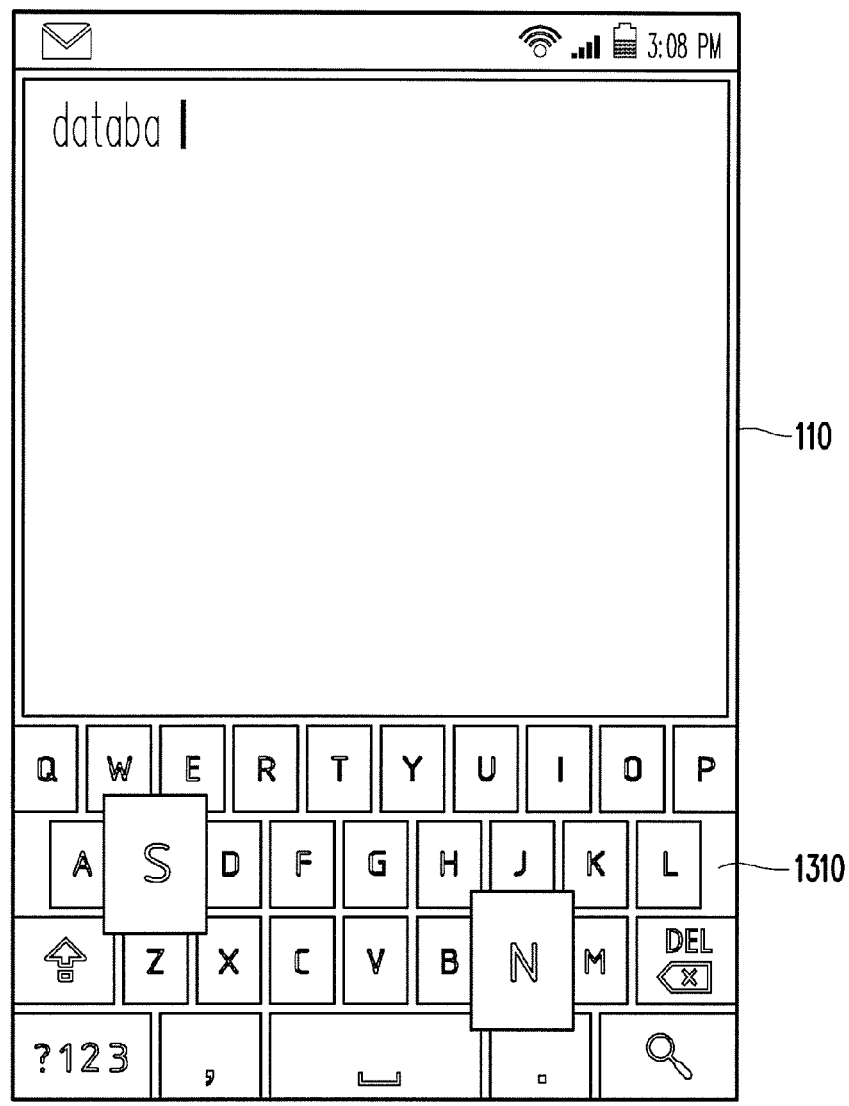
Figure 13B:
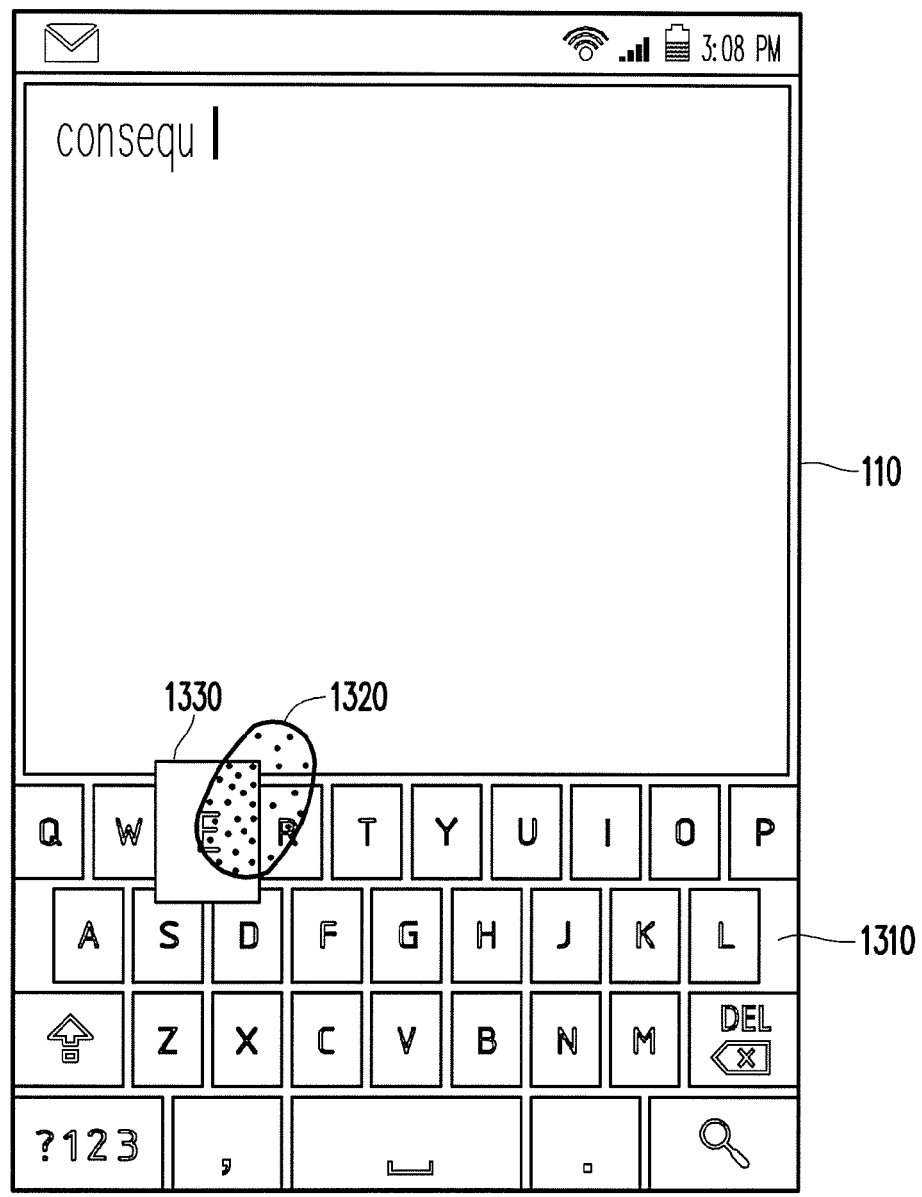

In one embodiment, while the user inputs character through the software input panel displayed on the touch screen 110, one or more candidate characters are determined according to a word database and the one or more input characters input through the software input panel, and a key on the software input panel corresponding to any one of the candidate characters is regarded as a specific object. For example, as shown in FIG. 13A, it is assumed that the user has already input the character string "databa," the next character candidate is determined to be characters "n" or "s" according to the word database, and therefore the specific objects are keys respectively corresponding to characters "n" and "s" on the software input panel 1310. In this embodiment, the display area of each of the keys corresponding to the candidate characters is enlarged. Besides the keys corresponding to characters "n" and "s," the remaining keys on the software input panel 1310 are regarded as the additional objects. In this embodiment, among the touch points that are not within the one or more specific object display areas, the weight value of any of the touch points that is within any of an additional object display area of each of the one or more additional objects is determined to be higher than the weight value of those touch points that are not within the one or more additional object display areas. That is, each touch point within any of the key display areas of the keys corresponding to characters "n" and "s" has the highest weight value, each touch point within any of the key display areas of the other keys on the software input panel 1310 has the second highest weight value, and each touch point not located in any key of the software input panel 1310 has the lowest weight value. Accordingly, the possibility that the typical coordinate value of a touch area inputted by a user is within any of the key display areas of the candidate characters is increased. To be specific, as shown in FIG. 13B, the user has already input the character string "consequ," the next character candidate is determined to be character "e" according to the word database, therefore the specific objects is key corresponding to character "e" on the software input panel 1310, and the key display area 1330 of the key corresponding to the candidate character "e" is enlarged. It is assumed that the touch area 1320 is detected. Since the key display area 1330 corresponding to the candidate character "e" is larger than the surrounding keys, the majority of touch points within the touch area 1320 are located in the key display area 1330, wherein the touch points within the key display area 1330 has a higher weighted value. Accordingly, it is very likely that the typical coordinate value of the touch area 1320 is located in the key display area 1330 corresponding to the candidate character "e," which can facilitate inputting a recommended word. However, it should be noted that, the typical coordinate value corresponding to the user input still has the possibility to be located in a key display areas which is different from the key display areas of the candidate characters.

Figure 14:
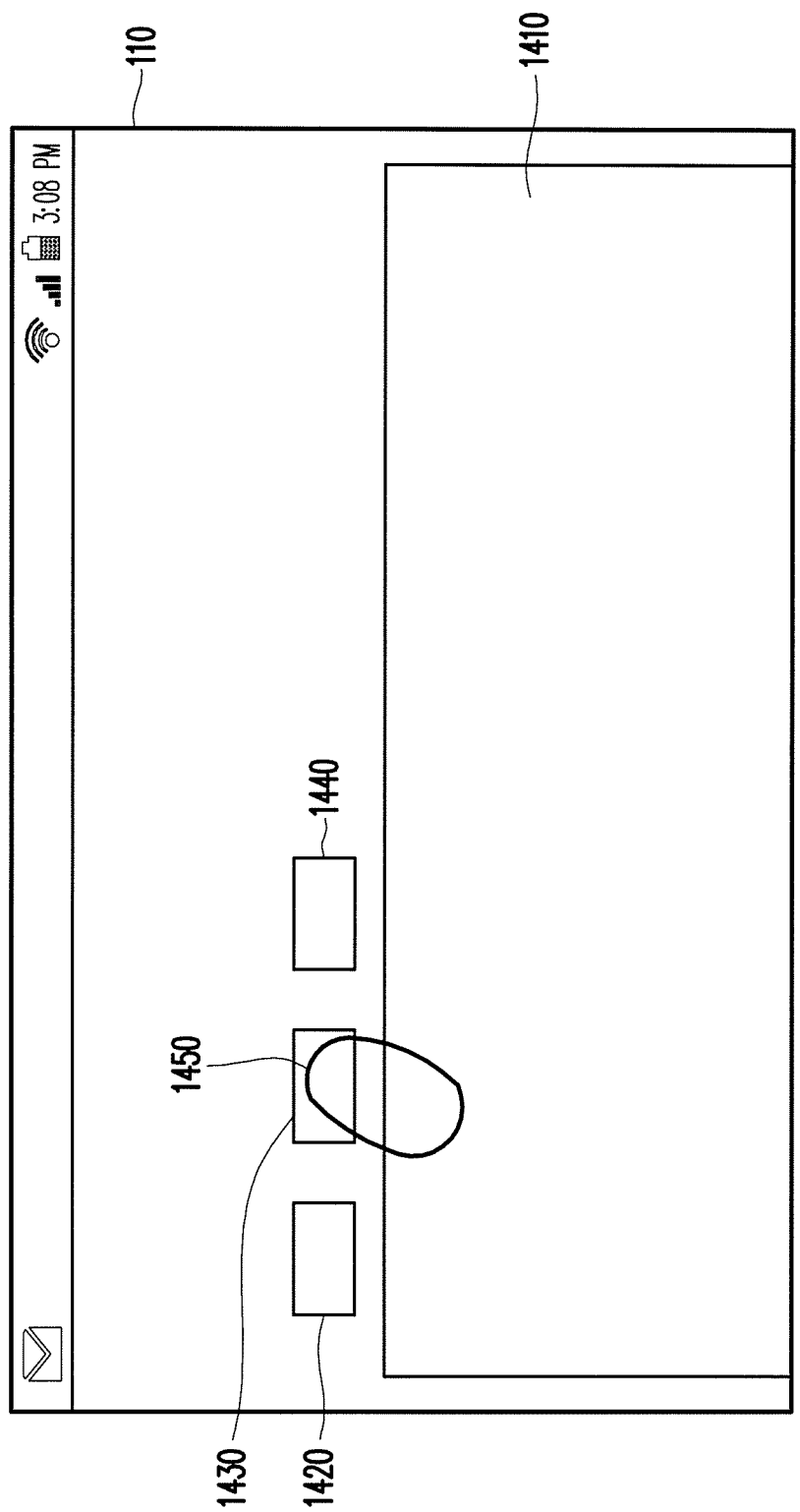
FIG. 14 is a schematic diagram illustrating a primary operating area according to an embodiment of the present invention.

In one embodiment, while the user is using the electronic device 100, a primary operating area on the touch screen 110 is determined according to an execution sequence of software modules running on the electronic device, and one or more objects located in the primary operating area are regarded as the one or more specific objects. As shown in FIG. 14, a primary operating area 1410 is determined to be the lower part of the touch screen 110, which is corresponding to a latest executed software module and one or more objects (not shown) are displayed within the primary operating area 1410. Above the primary operating area 1410, three selectable software buttons 1420, 1430, and 1440 are displayed. If there is a touch area 1450 detected by the touch screen 110, the weight value of each of the touch points inside the primary operating area 1410 and is coincide with any object within the primary operating area 1410 is higher than the weight value of each of the touch points outside the primary operating area 1410 or inside the primary operating area 1410 but not coincided with any object within the primary operating area 1410. Accordingly, regarding to the touch area 1450 overlapping a portion of the selectable software button 1430 and a portion of the primary operating area 1410, the probability of obtaining the typical coordinate value located in an object within the primary operating area 1410 is higher then the probability of obtaining the typical coordinate value located in the display area of the selectable software button 1430.

Figure 15:
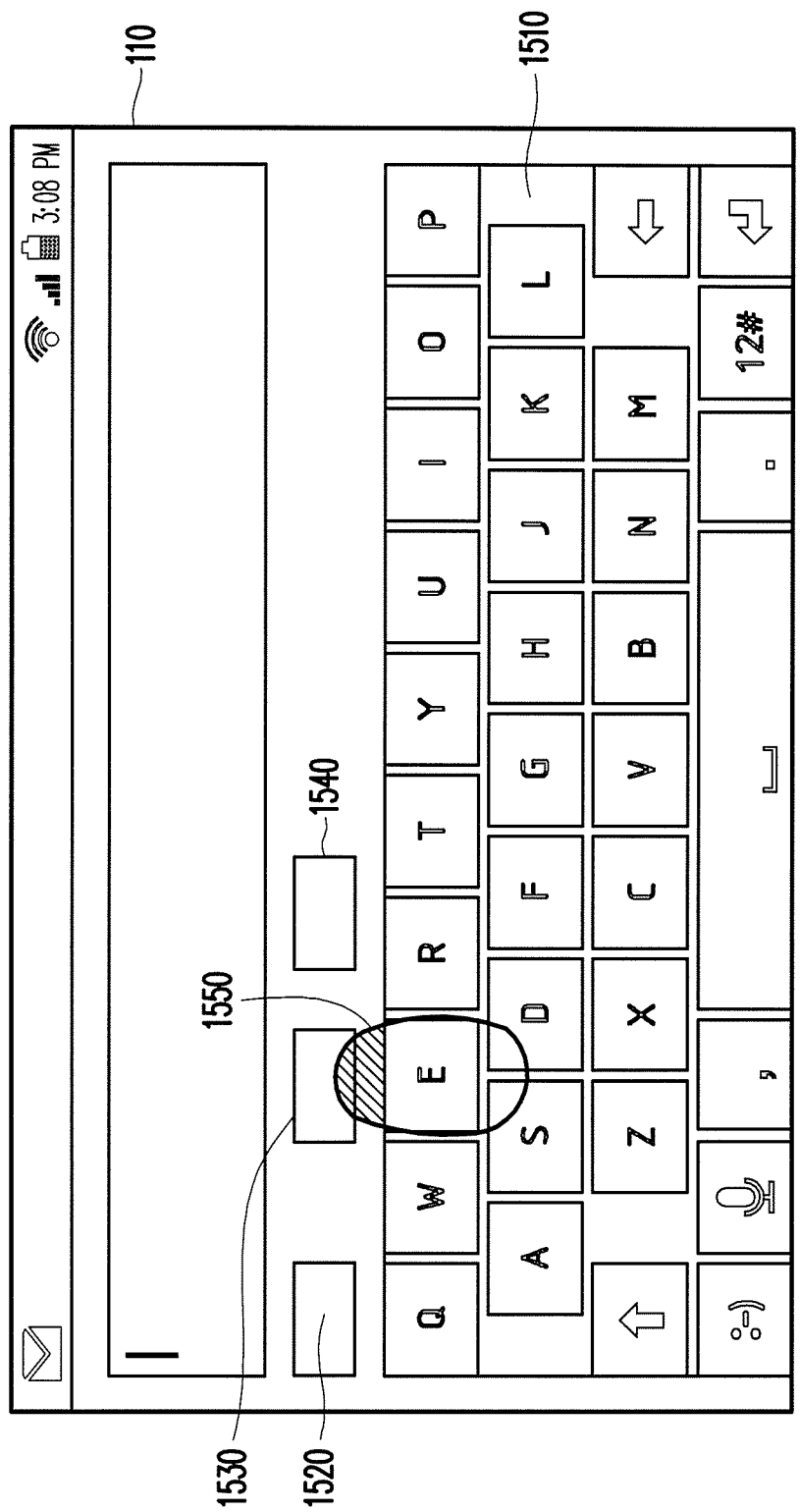
Figure 16:
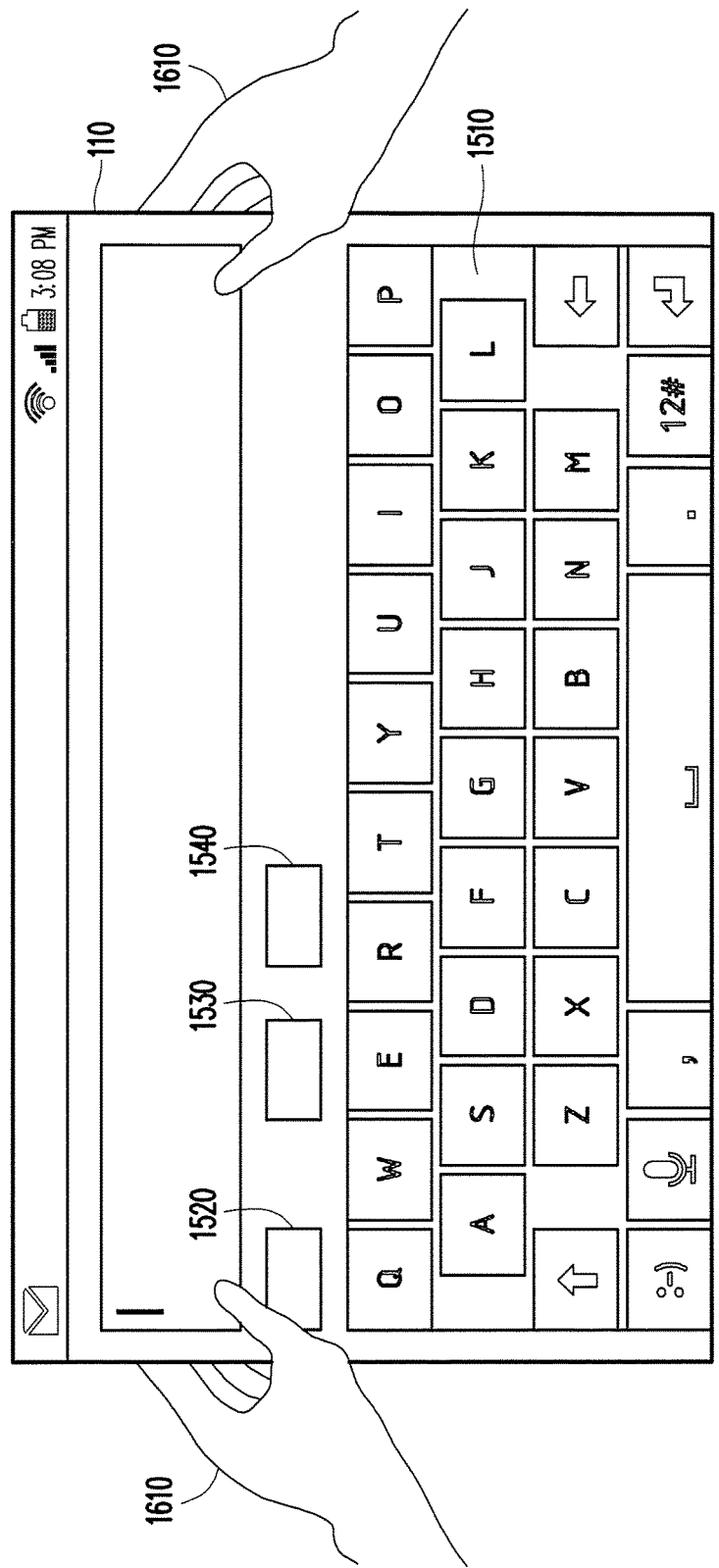

As shown in FIG. 15, three selectable software buttons 1520, 1530, and 1540 and a software input panel 1510 is displayed on the touch screen 110. Among the software modules respectively corresponding to selectable software buttons 1520, 1530, and 1540 and the software input panel 1510, it is assumed that the latest executed software module is corresponding to the software input panel 1510, so that the display area of the software input panel 1510 is regarded as the primary operating area, and each key on the software input panel 1510 is regarded as a specific object. While a touch area 1550 is detected by the touch screen 110, the weight value of any of the touch points located in the key display area of each of the keys corresponding to character "E," "S," and "D" is higher than the weight value of any of the touch points located in the upper region (represented by oblique lines) of the touch area 1550. Since the weight value of the touch point outside the primary operating area is relatively low (e.g., the weight value may be zero), the possibility that the typical coordinate value outside the primary operating area is small. Accordingly, as shown in FIG. 16, it is helpful to hold the electronic device 100 by allowing the user to keep his/her fingers on the touch screen 110. Referring to FIG. 16, it is assumed that the primary operating area is the display area of the software input panel 1510. Therefore, even though the selectable software button 1520 is touched by one of the hands 1610, the selectable software button 1520 will not be considered as being touched. In another embodiment, when the first detected touch area is on the wallpaper/background which is on the bottom layer of the graphical user interface (GUI)/visible area shown on the touch screen 110, the wallpaper/background would be considered as not being touched.

An embodiment of the invention provides a computer program product, in which the computer program product comprises a computer readable storage medium and an executable computer program mechanism embedded therein. After the computer program mechanism is executed by an electronic device having a touch screen, the electronic device can achieve the effects illustrated in the afore-described embodiments. The computer readable storage medium may be a read only memory, a random access memory, a magnetic tape, a floppy disk, a hard disk, an optical disk, or a transmission medium, etc. Alternatively, the computer program product may be directly provided through a network transmission, which is not to be limited by invention herein.

In summary, according to the method for controlling the electronic device, the electronic device using the same, and the computer program product, after the touch areas are detected, a typical coordinate value of each touch area is calculated by the coordinate values of the touch points contained within the touch areas. The typical coordinate value corresponding to each of the touch areas can exactly reflect the action of the user while using the electronic device, therefore by selecting the displayed objects according to the typical coordinate values to trigger the relative action, the operating result of the electronic device can be more precisely.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for operating an electronic device having a touch screen, comprising:
   detecting a plurality of touch areas of the touch screen for a plurality of touch signals comprising the a first touch signal and a second touch signal;
   obtaining, from the first touch signal, a first plurality of touch points detected within a first touch area of the touch screen, wherein an active object is displayed within the first touch area;
   determining based on the first plurality of touch points a first typical coordinate value;
   obtaining, from the second touch signal, a second plurality of touch points contained within the first touch area of the touch screen;
   determining based on the second plurality of touch points a second typical coordinate value; and
   in response to the first typical coordinate value detected to be outside of the active object but the second typical coordinate value detected to be inside the active object, triggering a function of the active object according to the second touch signal but not the first touch signal.

2. The method of claim 1, wherein the first typical coordinate value is determined based on each of the first plurality of touch points scaled by a first set of weight values that correspond to the first plurality of touch points, and the second typical coordinate value is determined based on each of the second plurality of touch points scaled by a second set of weight values that correspond to the second plurality of touch points, wherein each of the first set of weight values and each of the second set of weight values is determined based on its location relative to the active object.

3. The method of claim 2, wherein weight values inside of the active object are greater than weight values outside of the active object.

4. The method of claim 3, wherein the weight values outside of the active object is zero.

5. The method of claim 3, wherein the weight values inside of the active object is determined according to a pressure profile of the first touch signal or the second touch signal.

6. The method of claim 1, wherein the first touch signal and the second touch signal are detected by the touch screen with a time difference greater than a predetermined interval.

7. The method of claim 1, wherein the first touch signal and the second touch signal are detected by the touch screen with a time difference less than a predetermined interval.

8. The method of claim 1 further comprising:
obtaining a statistical pointer of a typical coordinate value corresponding to each of the touch areas;
if the statistical pointer is located in an object display area of one or more objects displayed on the touch screen, selecting the active object that the statistical pointer is located in the object display area thereof as the active object; and
if the statistical pointer is not located in any of the object display area of each of the one or more objects displayed on the touch screen, determining an object selecting scope on the touch screen according to the typical coordinate value corresponding to each of the touch areas, and selecting the one or more objects located in the object selecting scope to be the one or more active objects.

9. A method for operating an electronic device having a touch screen, comprising:
detecting a plurality of touch areas of the touch screen for a plurality of touch signals comprising the a first touch signal, a second touch signal, and a third touch signal, wherein the second touch signal and the third touch signal are detected by the touch screen to be within a predefined time interval;
obtaining, from the first touch signal, a first plurality of touch points detected within a first touch area of the touch screen, wherein an active object is displayed within the first touch area;
determining based on the first plurality of touch points a first typical coordinate value;
obtaining, from the second touch signal, a second plurality of touch points contained within the first touch area of the touch screen;
determining based on the second plurality of touch points a second typical coordinate value;
obtaining, from the third touch signal, a third plurality of touch points contained within the first touch area of the touch screen;
determining based on the third plurality of touch points a third typical coordinate value; and
in response to the first typical coordinate value detected to be outside of the active object but the second typical coordinate value and the third typical coordinate value detected to be inside the active object, triggering a function of the active object according to the second touch signal and the third touch signal but not the first touch signal.

10. The method of claim 9, wherein the first typical coordinate value is determined based on each of the first plurality of touch points scaled by a first set of weight values that correspond to the first plurality of touch points, and the second typical coordinate value is determined based on each of the second plurality of touch points scaled by a second set of weight values that correspond to the second plurality of touch points, and the third typical coordinate value is determined based on each of the third plurality of touch points scaled by a third set of weight values that corresponds to the third plurality of touch points, wherein each of the first set of weight values, each of the second set of weight values, and each of the third set of weight values is determined based on its location relative to the active object.

11. The method of claim 10, wherein weight values inside of the active object are greater than weight values outside of the active object.

12. The method of claim 11, wherein the weight values outside of the active object is zero.

13. The method of claim 11, wherein the weight values inside of the active object is determined according to a pressure profile of the first touch signal or the second touch signal or the third touch signal.

14. The method of claim 9, wherein the first touch signal relative to the second and the third touch signal detected by the touch screen has a time difference greater than the predefined interval.

15. The method of claim 9, wherein the first touch signal detected by the touch screen relative to the second and the third touch signal has a time difference less than the predefined time interval.

16. The method of claim 9 further comprising:
obtaining a statistical pointer of a typical coordinate value corresponding to each of the touch areas;
if the statistical pointer is located in an object display area of one or more objects displayed on the touch screen, selecting the active object that the statistical pointer is located in the object display area thereof as the active object; and
if the statistical pointer is not located in any of the object display area of each of the one or more objects displayed on the touch screen, determining an object selecting scope on the touch screen according to the typical coordinate value corresponding to each of the touch areas, and selecting the one or more objects located in the object selecting scope to be the one or more active objects.

17. A mobile electronic device comprising:
a touch screen;
memory;
one or more processors executing one or more instructions stored in the memory to:
detect a plurality of touch areas of the touch screen for a plurality of touch signals comprising the a touch signal and a second touch signal;
obtain, from on the first touch signal, a first plurality of touch points detected within a first touch area of the touch screen, wherein an active object is displayed within the first touch area;
determine based on the first plurality of touch points a first typical coordinate value;
obtain, from the second touch signal, a second plurality of touch points contained within the first touch area of the touch screen;
determine based on the second plurality of touch points a second typical coordinate value; and in response to the first typical coordinate value detected to be outside of the active object but the second typical coordinate value detected to be inside the active object; trigger a function of the active object according to the second touch signal but not the first touch signal.

18. A mobile electronic device comprising:
a touch screen;
memory;
one or more processors; and
one or more instructions, wherein the one or more instructions are stored in the memory and configured to be executed by the one or more processors to:
detect a plurality of touch areas of the touch screen for a plurality of touch signals comprising the a touch signal, a second touch signal, and a third touch signal, wherein the second touch signal and the third touch signal are detected by the touch screen to be within a predefined time interval;
obtain, from on the first touch signal, a first plurality of touch points detected within a first touch area of the touch screen, wherein an active object is displayed within the first touch area;
determine based on the first plurality of touch points a first typical coordinate value;
obtain, from the second touch signal, a second plurality of touch points contained within the first touch area of the touch screen;
determine based on the second plurality of touch points a second typical coordinate value;
obtain, from the third touch signal, a third plurality of touch points contained within the first touch area of the touch screen;
determine based on the third plurality of touch points a third typical coordinate value; and
in response to the first typical coordinate value detected to be outside of the active object but the second typical coordinate value and the third typical coordinate value detected to be inside the active object, trigger a function of the active object according to the second touch signal and the third touch signal but not the first touch signal.

19. A method for operating an electronic device having a touch screen, comprising:
detecting a plurality of touch areas of the touch screen for a plurality of touch signals comprising the a first touch signal, a second touch signal, and a third touch signal, wherein the second touch signal and the third touch signal are detected by the touch screen to be within a predefined time interval;
obtaining, from the first touch signal, a first plurality of touch points detected within a first touch area of the touch screen, wherein an active object is displayed within the first touch area;
determining from the first plurality of touch points a first typical coordinate value based on scaling each of the first plurality of touch points within the first touch area by a first set of weight values that corresponds to the each of the first plurality of touch points;
obtaining, from the second touch signal, a second plurality of touch points contained within the second touch area of the touch screen, wherein the first touch area is different from the second touch area;
determining from the second plurality of touch points a second typical coordinate value based on scaling each of the second plurality of touch points within the second touch area by a second set of weight values that corresponds to the each of the second plurality of touch points;
obtaining, from the third touch signal, a third plurality of touch points contained within the third touch area of the touch screen, wherein the third touch area is different from the first touch area and the second touch area;
determining from the third plurality of touch points a third typical coordinate value based on scaling each of the third plurality of touch points within the third touch area by a third set of weight values that corresponds to the each of the third plurality of touch points; and
in response to the first typical coordinate value detected to be outside of the active object but the second typical coordinate value and the third typical coordinate value detected to be inside the active object, triggering a function of the active object according to the second touch signal and the third touch signal but not the first touch signal.

20. The method of claim 19, wherein each of the first set of weight values is determined based on first set of pressure values that corresponds to the each of the first plurality of touch points, each of the second set of weight values is determined based on a second set of pressure values that corresponds to the each of the second plurality of touch points, and each of the third set of weight values is determined based on a third set of pressure values that corresponds to the each of the third plurality of touch points.

21. The method of claim 20, wherein the first set of weight values, the second set of weight values, and third set of weight values inside of the first touch area, the second touch area, and the third touch areas respectively is greater than the first set of weight values, second set of weight values, and third set of weight values outside of the first touch area, second touch area, and third touch areas respectively.

22. The method of claim 21, wherein the weight values outside of the first touch area are zero, the weight values outside of the second touch area are zero, and the weight values outside of the third touch area are zero.

23. The method of claim 20, wherein each of the first set of weight values is determined based on location of the each of the first plurality of touch points, each of the second set of weight values is determined based on location of the each of the second plurality of touch points, and each of the third set of weight values is determined based on location of the each of the third plurality of touch points.

24. The method of claim 19, wherein the first touch signal relative to the second and the third touch signal detected by the touch screen has a time difference less than the predefined interval.

25. A method for operating an electronic device having a touch screen,
comprising:
detecting a plurality of touch areas of the touch screen for a plurality of touch signals comprising the a first touch signal and a second touch signal;
obtaining, from on the first touch signal, a first plurality of touch points detected within a first touch area of the touch screen, wherein an active object is displayed within the first touch area;
determining from the first plurality of touch points a first typical coordinate value based on scaling each of the first plurality of touch points within the first touch area by a first set of weight values that corresponds to the each of the first plurality of touch points;
obtaining, from the second touch signal, a second plurality of touch points contained within the second touch area of the touch screen, wherein the first touch area is different from the second touch area;

determining from the second plurality of touch points a second typical coordinate value based on scaling each of the second plurality of touch points within the second touch area by a second set of weight values that corresponds to the each of the second plurality of touch points; and in response to the first typical coordinate value detected to be outside of the active object but the second typical coordinate value detected to be inside the active object, triggering a function of the active object according to the second touch signal but not the first touch signal.

26. The method of claim 25, wherein each of the first set of weight values is determined based on first set of pressure values that corresponds to the each of the first plurality of touch points and each of the second set of weight values is determined based on a second set of pressure values that corresponds to the each of the second plurality of touch points.

27. The method of claim 26, wherein first set of weight values and the second set of weight values inside of the first touch area and the second touch area respectively is greater than the first set of weight values and second set of weight values outside of the first touch area and second touch area respectively.

28. The method of claim 27, wherein the weight values outside of the first touch area are zero and the weight values outside of the second touch area are zero.

29. The method of claim 26, wherein, each of the first set of weight values is determined based on location of the each of the first plurality of touch points, and each of the second set of weight values is determined based on location of the each of the second plurality of touch points.

30. The method of claim 25, wherein the first touch signal and the second touch signal are detected by the touch screen with a time difference greater than a predetermined interval or a less than the predetermined interval.

* * * * *